(12) United States Patent
Nefzger et al.

(10) Patent No.: US 7,763,683 B2
(45) Date of Patent: Jul. 27, 2010

(54) POLYESTER POLYOLS, A PROCESS FOR THE PRODUCTION THEREOF AND THE USE THEREOF

(75) Inventors: Hartmut Nefzger, Pulheim (DE); Gerhard Klein, Monheim (DE); Manfred Schmidt, Dormagen (DE); Jens Krause, Köln (DE); James-Michael Barnes, Breitscheid (DE); Erika Bauer, Jüchen (DE)

(73) Assignee: Bayer MaterialScience AG, Leverkusen (DE)

( * ) Notice: Subject to any disclaimer, the term of this patent is extended or adjusted under 35 U.S.C. 154(b) by 0 days.

(21) Appl. No.: 11/906,446

(22) Filed: Oct. 2, 2007

(65) Prior Publication Data
US 2008/0090973 A1  Apr. 17, 2008

(30) Foreign Application Priority Data
Oct. 12, 2006 (DE) .................. 10 2006 048 288

(51) Int. Cl.
C08G 18/42 (2006.01)
C08F 18/10 (2006.01)
C08G 63/08 (2006.01)

(52) U.S. Cl. ............. 525/415; 525/440.01; 525/440.13; 525/440.14; 525/440.15; 525/450

(58) Field of Classification Search ............. 525/440.01
See application file for complete search history.

(56) References Cited

U.S. PATENT DOCUMENTS

| 1,893,982 | A | * | 1/1933 | Bradley | 530/216 |
|---|---|---|---|---|---|
| 2,933,477 | A | | 4/1960 | Hostettler | 260/77.5 |
| 3,892,714 | A | * | 7/1975 | Sampson et al. | 528/75 |
| 4,501,829 | A | * | 2/1985 | Oda et al. | 523/400 |
| 4,731,422 | A | * | 3/1988 | Tanabe et al. | 525/437 |
| 5,705,595 | A | * | 1/1998 | Oda et al. | 528/71 |
| 5,810,749 | A | | 9/1998 | Maas | 602/6 |
| 5,880,171 | A | | 3/1999 | Lim et al. | 523/106 |
| 5,911,923 | A | | 6/1999 | Work et al. | 264/4.7 |
| 5,955,169 | A | | 9/1999 | Hoshino et al. | 428/65.3 |
| 2003/0008161 | A1 | * | 1/2003 | Kida et al. | 428/480 |
| 2005/0165125 | A1 | * | 7/2005 | Tsunoda et al. | 522/1 |
| 2006/0158111 | A1 | * | 7/2006 | Hayashi | 313/512 |

FOREIGN PATENT DOCUMENTS

| EP | 0 509 494 B1 | 2/1997 |
|---|---|---|
| EP | 1 382 622 A1 | 1/2004 |
| GB | 1 289 515 | 9/1972 |
| GB | 1 376 353 | 12/1974 |

* cited by examiner

Primary Examiner—Randy Gulakowski
Assistant Examiner—Mike Dollinger
(74) Attorney, Agent, or Firm—N. Denise Brown; Noland J. Cheung

(57) ABSTRACT

The present invention relates to polyester polyols with low functionality and a process for their production, to prepolymers prepared from these polyester polyols and a process for their production, and to polyurethanes prepared from these polyester polyols and/or from these prepolymers, and to processes for their production. These polyester polyols are produced in a two-step process. In the second step of this two-step process, one or more cyclic ester monomers is reacted with one or more polyester polyols at low temperatures.

4 Claims, No Drawings

POLYESTER POLYOLS, A PROCESS FOR THE PRODUCTION THEREOF AND THE USE THEREOF

CROSS REFERENCE TO RELATED PATENT APPLICATION

The present patent application claims the right of priority under 35 U.S.C. §119 (a)-(d) of German Patent Application No. 10 2006 048 288.3, filed Oct. 11, 2006.

BACKGROUND OF THE INVENTION

The present invention relates to a process for the production of polyester polyols having low viscosity values, prepolymers prepared from these polyester polyols, polyurethanes prepared from these polyester polyols and/or from these prepolymers, and to processes for their production.

The use of ε-caprolactone as a constituent of polyester polyols, which can in turn be used, for example, in the production of polyurethanes, has been known for a long time. See W. Meckel, W. Goyert and W. Wieder in Thermoplastic Elastomers, A Comprehensive Review, N. R. Legge, G. Holden and H. E. Schroeder, Hanser Publishers Munich 1987, p. 17).

The synthesis of poly-ε-caprolactones from monomeric ε-caprolactones is also known. According to the disclosure of U.S. Pat. No. 2,933,477, the production of poly-ε-caprolactones takes place by reacting bifunctional starter molecules with lactones. The molecular weight of the poly-ε-caprolactone obtained by this process is substantially determined by the molar ratio of starter molecules and monomeric ε-caprolactone molecules used. According to U.S. Pat. No. 2,933,477, starter molecules are those originating from the group $R'(ZH)_2$, in which Z substantially denotes —O—, —NH—, or —NR"— and in which R' denotes a hydrocarbon residue which is selected from the group consisting of alkylene, arylene, aralkylene and cycloalkylene. Examples of these starters are, for example, diols, such as ethylene glycol, amino alcohols, such as ethanolamine, or diamines, such as piperazine, etc. Hydroxyl group-terminated polyethers such as, for example, polypropylene oxides, polytetrahydrofurans etc., can also be used as starter molecules. The polymerization takes place in a temperature range of 50 to 300° C., preferably 120 to 200° C., preferably in the presence of a catalyst, which can be basic, acidic or neutral or can be a transesterification catalyst.

Compared with structurally similar polyadipates, poly-ε-caprolactones are distinguished by their increased hydrolytic stability when used as soft segment components in polyurethane systems. This is why they are used despite their increased costs. However, they have a tendency towards augmented crystallization, which means that, because of this hardening tendency, they are unsuitable for many applications. This problem can be remedied according to DE-A 1 946 873, by modifying poly-ε-caprolactones by incorporating dicarboxylic acids and diols. Polyurethane elastomers made from poly-ε-caprolactones modified in this way are also distinguished by increased hydrolytic stability with a reduced or non-existent tendency towards crystallization and hardening.

To produce the modified poly-ε-caprolactones, the ε-caprolactone, dicarboxylic acid and diol components are mixed and heated to temperatures of preferably 100 to 250° C., thus forming polyester polyols which have OH numbers of 40 to about 80 mg KOH/g, depending on the feed ratios, with water being eliminated. The proportion of ε-caprolactone can range from 10 to 75 wt. %, but preferably from 25 to about 70 wt. %. The typical representatives for preparing polyester polyols include, for example, succinic acid, adipic acid etc., which can be used as dicarboxylic acids, and ethylene glycol, butylene glycol, etc. which can be used as diols. In addition, small quantities of representatives with higher functionalities, such as glycerol, 1,1,1-trimethylolpropane, etc. may also be used.

From DE-A 2 115 072, the use of certain catalysts (e.g. antimony halides) and special ways of conducting reactions (e.g. pre-reaction of ε-caprolactone with polyols and subsequent reaction with polycarboxylic acid) are known for the production of the modified poly-ε-caprolactones (i.e. mixed polyester polyols).

These mixed polyester polyols are used in particularly high-value applications such as, for example, floppy disks (see U.S. Pat. No. 5,955,169), for the microencapsulation of water-soluble, water-dispersible or water-sensitive materials (see U.S. Pat. No. 5,911,923), in the production of ophthalmic lenses (see U.S. Pat. No. 5,880,171), bone substitute material for stabilizing damaged nasal bones (U.S. Pat. No. 5,810,749), production of spherical polyurethane particles (see EP-A 0 509 494), etc.

In addition, polyether esters containing caprolactone units, e.g. based on polyoxyethylene-polyoxypropylene-polyoxyethylene block copolymers, are interesting building blocks in medical applications. These are interesting since they contain hydrophilic structural elements (PEO) which give the system special, controllable properties in relation to gelling behavior in water, degradation kinetics and the temperature dependence of the rheological behaviour. (See D. Cohn et al., Biomaterials 27 (2006) 1718).

Where polyesters are used, e.g. in polyurethane (PU) applications, in addition to the properties of the PU end product, the production process thereof is also the subject of improvement efforts. It is of decisive importance, for example, that the processing properties of a reacting polyurethane melt must be easy to handle. This is particularly true of its viscosity, which, as far as possible, should not exceed a certain limit. Melts of too high a viscosity can be poured into molds only with difficulty, for example, or can no longer be completely mixed with the chain extender within a given time, and so products produced in this way are of no value. It is known that systems based on polyether polyols have lower viscosities, and so this problem can be solved in some cases by replacing the polyester polyol with a polyether polyol if the application allows.

It is also known that the viscosity of polyols generally rises with increasing molecular weight. (See, for example, P. C. Hiemenz: Polymer Chemistry, The Basic Concepts, Marcel Dekker, Inc. New York, p. 104, 1984). The above-mentioned processing problem therefore occurs particularly when a) polyester polyols, b) polyester polyols with higher molecular weights and c) polyester polyols with higher molecular weights and higher functionalities are used, with the processing problem becoming progressively more acute from a) to b) to c). Nevertheless, it may be necessary to implement even the particularly critical cases b) and c), with the disadvantages hitherto associated therewith, e.g. when comparatively flexible cast elastomers with comparatively high softening points have to be prepared. In this case, for example, a comparatively high proportion of a chain extender must then be reacted with a prepolymer having a comparatively large number of NCO groups in order to be able to achieve a high degree of hard segment oligomerization and, associated therewith, a high softening point. To reduce the hardness, it is necessary in such cases to use a polyol in which the chain is as long as possible and, depending on the requirements of the application, a polyester polyol that is as long-chained as possible. However, based on what was stated above, precisely this combination is particularly problematic.

One solution to this problem consists in using polyol-initiated poly-ε-caprolactones. Compared with polyadipates that are comparable in terms of molecular weight and functionality, poly-ε-caprolactones are distinguished by the fact that they exhibit considerably lower viscosity. Thus, from a technological point of view, they provide a thoroughly satisfactory solution to the problem described.

Unfortunately, however, compared with the polyadipates that are comparable in terms of molecular weight and functionality, poly-ε-caprolactones are significantly more expensive. Therefore, poly-ε-caprolactones cannot be used economically in many applications.

The object of the present invention was therefore to provide polyester polyols which, in comparison to similar, conventional polyester polyols, exhibit significantly lower viscosities and, in addition, which can be prepared by technically simple, economically favorable means, as well as a process for the production thereof.

In this context, conventional polyester polyols are those made up entirely or predominantly of polycarboxylic acids or derivatives thereof with at least 2 and no more than 6, preferably 4, carboxyl groups, and a total of 4 to 12 carbon atoms, i.e. for example adipic, glutaric, succinic, phthalic acid etc., and which are produced at temperatures of $\geq 180°$ C. with the elimination of water or of a low molecular-weight, usually monofunctional alcohol.

Surprisingly, it has been found that polyester polyols produced from particular starting compounds, which are reacted together in a particular sequence under defined conditions, exhibit significantly lower viscosities and the process for their production is technically simply and economical.

SUMMARY OF THE INVENTION

The process for the production of polyester polyols of the invention is a two-step process. This process comprises, in the first step, the production of a polyester polyol, as an intermediate, in which the polyester polyol has an acid value close to zero, and is produced under typical esterification conditions by reacting one or more polycarboxylic acids with one or more polyols, and then, in the second step, this intermediate polyester polyol is reacted with one or more cyclic ester monomers.

This invention relates to a process for the production of polyester polyols which have functionalities of from 1.95 to 3.25 and OH numbers of 90 to 33 mg KOH/g. This process comprises:

1) reacting
   a) one or more organic polycarboxylic acids having 4 to 12 carbon atoms and from 2 to 4 carboxyl groups, derivatives thereof, and/or mixtures thereof, with
   b) one or more organic polyols having functionalities of from 2 to 4 and number-average molecular weights of from 62 to 400 g/mol,
   at temperatures of from 150 to 250° C. under vacuum to form hydroxyl group-terminated polyester polyols Z having a hydroxyl number of from 100 to 40 mg KOH/g and a functionality of from 1.95 to 3.25, and then
2) adding
   c) one or more cyclic ester monomers, preferably ε-caprolactone,
   to said hydroxyl-group terminated polyester polyols Z at starting temperatures below 220° C., in a ratio by weight of polyester polyol Z to cyclic ester monomer of from 10:1 to 1:1, with the temperature being less than or equal to 175° C. after no more than 60 minutes, wherein the OH number of the polyester polyol Z is reduced by at least 5 mg KOH/g, and the ratio of moles of the cyclic ester monomer to the hydroxyl groups of the polyester polyol Z ranges from 0.75:1 to 10:1.

DETAILED DESCRIPTION OF THE INVENTION

The resultant polyester polyols exhibit significantly lower viscosity values in comparison to polyester polyols of the same overall composition but that are produced in a conventional manner, i.e. in a one-step reaction.

The viscosity of the polyester polyol obtained in the first step is not increased substantially during the reaction with cyclic ester monomers in the second step.

The two reaction steps can, of course, be performed in the same or in different reaction vessels.

Polyester polyols Z which are formed in/from the first step include all polyester polyols known to the person skilled in the art and that can be used for the production of PU (polyurethane) elastomers. They are produced by reacting one or more organic polycarboxylic acids or polycarboxylic acid derivatives or mixtures thereof, in such a way that polyester polyols Z are obtained, in which polyester polyols Z are predominantly hydroxyl group-terminated and have an acid number of approximately zero.

Suitable organic polycarboxylic acids are preferably bifunctional, aliphatic or aromatic or araliphatic carboxylic acids with from 4 to 12 C atoms. Particularly preferably are the carboxylic acids selected from the group consisting of 2,2-dimethylmalonic acid, succinic acid, glutaric acid, adipic acid, pimelic acid, sebacic acid, suberic acid, phthalic acid, terephthalic acid and isophthalic acid.

Mixtures of organic polycarboxylic acids and/or the derivatives (e.g. esters) thereof with low molecular-weight, monofunctional alcohols and/or polyesters thereof, can of course also be used.

Anhydrides of dicarboxylic acids can, of course, also be used. Examples of anyhydrides are: phthalic anhydride, succinic anhydride, etc.

Bifunctional, aliphatic and/or araliphatic polyols with from 2 to 20 C atoms are preferably used as organic polyols. Particularly preferred compounds to be used as organic polyols are those polyols selected from the group consisting of ethylene glycol, propylene glycol, butylene glycol, pentylene glycol, hexylene glycol, octylene glycol, decylene glycol, dodecylene glycol and hydroquinone bis(2-hydroxyethyl) ether. Polyols from the homologous series of the oligoethylene oxide, oligopropylene oxide and oligobutylene oxide are also preferred.

Suitable polyols and/or polycarboxylic acids having a functionality greater than 2, such as e.g. 1,1,1-trimethylolpropane, glycerol, pyromellitic acid etc., can also be incorporated.

The production of the polyester polyols Z in the first step takes place in a manner that is known per se, by mixing the reactants and slowly heating them to temperatures of at least 150° C., preferably at least 180° C., while stirring, and distilling off the water (or possibly the low molecular-weight monofunctional alcohol) that has been eliminated from the reaction. It is preferred that no catalyst is used. The reaction is completed by slowly reducing the pressure, ultimately to values of less than 50 mbar, preferably less than 25 mbar. An esterification catalyst is preferably added during this operation (i.e. during the reduction of pressure) in quantities of from 1 to 100 ppm. However, it is also possible to work without a catalyst, which leads to an increase in the reaction time.

The reaction is ended when the polyester polyols Z have an acid number of less than 10, preferably less than 5, and more preferably less than 3 mg KOH/g.

The reaction for the production of the intermediate (polyester polyol Z) can also, of course, be carried out using an entraining agent, such as e.g. dioxane, toluene, etc. In this embodiment, the entraining agent is separated off by distillation at the end of the reaction.

The second step of the process comprises reacting the polyester polyols Z with one or more cyclic ester monomer. A particularly preferred method for this reaction is that in which the polyester polyol Z is stirred with the cyclic ester monomer at a starting temperature of less than 220° C., preferably from 180 to 210° C., for no more than 60 minutes and preferably for no more than 45 minutes, and the reaction is then completed, after the starting period, at temperatures of less than 175° C., and preferably at temperatures of from 140 to 170° C.

For a rapid, approximate determination of the conversion of cyclic ester monomer, it is possible to refer to the refractive index of the reaction mixture. A constant value of refractive index indicates that the reaction is substantially complete. For a fine analysis, however, the known methods such as, for example, high pressure liquid chromatography (HPLC), gel permeation chromatography (GPC) etc., should be used.

Reaction products (i.e. the resultant polyester polyols) that can be used in practice have contents of free cyclic ester monomer of no more than 3 wt. %, preferably no more than 1.5 wt. %, and more preferably no more than 1 wt. %.

To react the polyester polyol Z with cyclic ester monomer, it is of course also possible to use catalysts. All transesterification and esterification catalysts known to the person skilled in the art are suitable as catalysts. The following are mentioned as examples: tin(II) halides, organotin compounds, titanium and zirconium alkoxylates, tin and bismuth carboxylates, etc.

The polyester polyols produced by the process of the invention preferably have OH numbers that are at least 5 mg KOH/g lower in comparison to the OH numbers of the polyester polyol Z. The weight ratio of polyester polyol Z to cyclic ester monomer is 10:1 to 1:1. The ratio of moles of the cyclic ester monomer to moles of the hydroxyl groups of the polyester polyol Z is at least 0.75:1 to 10:1.

The polyester polyols produced by the process of the invention have significantly reduced viscosity values compared with those polyester polyols having the same overall composition and the same functionality.

The polyester polyols produced by the process of the invention can be used as the polyol component, or as part of the polyol component, for the production of prepolymers and/or for the production of polyurethanes.

Isocyanate-terminated prepolymers comprise the reaction product of one or more organic di- or polyisocyanate with at least one polyester polyol of the present invention. These isocyanate-terminated prepolymers are prepared by reacting one or more organic di- or polyisocyanates with at least one polyester polyol as described herein. The isocyanate-terminated prepolymers are prepared in the known manner using an excess of isocyanate.

In the production of, for example, foamed and non-foamed polyurethanes with densities of 0.4 to 1.3 g/ml, these can be produced by reacting one or more organic polyisocyanate components with an isocyanate-reactive component that comprises at least one of the polyester polyols produced according to the invention. The production of these polyurethanes can take place, for example, by the known casting process.

In the production of the isocyanate-terminated prepolymers and of the polyurethanes, poly-isocyanates selected from the group consisting of diphenylmethane diisocyanate, toluene diisocyanate, naphthylene diisocyanate, hexamethylene diisocyanate, cyclohexylene diisocyanate, 1-isocyanato-3-isocyanatomethyl-3,3,5-trimethylcyclohexane (isophorone diisocyanate; IPDI), 3,3'-dimethyl-4,4'-biphenyl diisocyanate (TODI), meta-tetramethylxylene diisocyanate (TMXDI), phenylene diisocyanate, tetramethylphenylene diisocyanate and 4,4'-dicyclohexylmethane diisocyanate are preferably used.

The following examples further illustrate details for the process of this invention. The invention, which is set forth in the foregoing disclosure, is not to be limited either in spirit or scope by these examples. Those skilled in the art will readily understand that known variations of the conditions of the following procedures can be used. Unless otherwise noted, all temperatures are degrees Celsius and all percentages are percentages by weight.

EXAMPLES

Example 1

Comparative 48.3 parts by weight adipic acid
26.1 parts by weight 1,4-butanediol
8.5 parts by weight 1,6-hexanediol
0.8 parts by weight 1,1,1-trimethylolpropane
16.3 parts by weight ε-caprolactone were weighed into a flask and slowly heated to 200° C. with stirring under standard pressure. Approx. 11 parts water were distilled off. At the end of the elimination of water, 20 ppm tin dichloride dihydrate were added and a vacuum (15 mbar) was slowly applied over the course of approx. 4 hours. The reaction was completed under these conditions within a further approx. 15 hours. The acid value, OH number and viscosity were determined and are set forth below.

| | |
|---|---|
| Acid value: | 0.5 mg KOH/g |
| OH number: | 47.4 mg KOH/g |
| Functionality: | 2.16 |
| Viscosity: | 1320 mPas/75° C. |

Example 2

According to the Invention 48.3 parts by weight adipic acid
26.1 parts by weight 1,4-butanediol
8.5 parts by weight 1,6-hexanediol
0.8 parts by weight 1,1,1-trimethylolpropane were weighed into a flask and slowly heated to 200° C. with stirring under standard pressure. Approx. 11 parts water were distilled off. At the end of the elimination of water, 20 ppm tin dichloride dihydrate were added and a vacuum (15 mbar) was slowly applied over the course of approx. 4 hours. The reaction was completed under these conditions within a further approx. 15 hours. The acid value and OH number of the intermediate polyester polyol were determined and are set forth below.

| Acid value: | 0.2 mg KOH/g |
|---|---|
| OH number: | 60.5 mg KOH/g |
| Functionality: | 2.16 |

The product was cooled to 150° C., and 16.3 parts by weight ε-caprolactone were added and the mixture was stirred at 150° C. for approx. 20 hours until the refractive index was constant (1.46376 at 50° C.). The acid value, OH number, viscosity and the proportion of free caprolactone were determined and are set forth below.

| Acid value: | 0.9 mg KOH/g |
|---|---|
| OH number: | 45.0 mg KOH/g |
| Viscosity: | 750 mPas/75° C. |
| Proportion of free caprolactone: | 0.86 wt. % |

Example 3

Comparative

Example 2 was repeated with the sole difference being that the ε-caprolactone was added to the intermediate polyester polyol product which had been heated to 200° C. This reaction mixture was maintained at a temperature of 200° C. for 5 hours. The resultant polyester polyol product had a functionality of 2.18. The acid value, OH number and viscosity of this product are set forth in Table 1.

Example 4

Comparative

Example 2 was repeated with the difference that, in the first step, ε-caprolactone was reacted with 1,6-hexanediol; and in the second step, 1,4-butanediol, 1,1,1-trimethylolpropane and adipic acid were added to this product at 200° C. This temperature was maintained for 20 hours. This product had a functionality of 2.16. The acid value, OH number and viscosity of this product are set forth in Table 1.

A comparison of examples 1 and 2 shows that the polyester polyol produced according to the invention (Example 2) has a significantly lower viscosity with a similar OH number and an identical overall composition.

TABLE 1

Formulations and properties (for a constant overall composition)

| | | Example | | | |
|---|---|---|---|---|---|
| | | 1 (comp.) | 2 | 3 (comp.) | 4 (comp.) |
| Adipic acid | [wt. %] | 48.3 | 48.3 | 48.3 | 48.3 |
| 1,4-Butanediol | [wt. %] | 26.1 | 26.1 | 26.1 | 26.1 |
| 1,6-Hexanediol | [wt. %] | 8.5 | 8.5 | 8.5 | 8.5 |
| 1,1,1-Trimethylolpropane | [wt. %] | 0.8 | 0.8 | 0.8 | 0.8 |
| ε-Caprolactone | [wt. %] | 16.3 | 16.3 | 16.3 | 16.3 |
| Process | Steps | 1 step | 2 steps | 2 steps | 2 Steps Step 1: caprolactone and 1,6-hexanediol Step 2: esterification with butanediol, TMP and adipic acid |
| Temperature step 2 | [° C.] | — | 150 | 200 | 200 |
| Residence time step 2 | [hours] | — | 20 | 5 | 20 |
| OH number | [mg KOH/g] | 47.4 | 45 | 45.7 | 44.4 |
| Functionality | | 2.16 | 2.16 | 2.18 | 2.16 |
| Acid value | [mg KOH/g] | 0.5 | 0.9 | 0.8 | 0.3 |
| Viscosity, 75° C. | [mPas] | 1320 | 750 | 1510 | 1610 |
| Proportion of free caprolactone | [wt. %] | n.d. | 0.86 | n.d. | n.d. |

(comp.): comparative test
n.d.: not determined

The results from Table 1 show that, with the same composition, i.e. identical quantitative ratios of the polyols and polycarboxylic acids and of ε-caprolactone, and similar molecular weights or hydroxyl numbers of the products (44.4 to 47.4), polyester polyols with low viscosities (≦1000 mPas at 75° C.) are only obtained when the process is carried out according to the invention.

Examples 5a to 5c

The intermediate was produced as described in Example 2. The intermediate polyester polyol was produced from 1,4-butanediol, 1,6-hexanediol and 1,1,1-trimethylolpropane as well as adipic acid (see Table 2 for quantitative ratios). ε-Caprolactone was then added to the intermediate polyester polyol in various quantities (see Table 3) over the course of 30 minutes using a dropping funnel. At the beginning, the temperature of the initial polyester polyol here was 200° C. During the addition of the ε-caprolactone, the temperature was reduced to 150° C. 10 ppm tin dichloride dihydrate were added, stirring was continued at this temperature for a further 10 hours and the OH number, viscosity and proportion of free caprolactone were determined. These are set forth in Table 3.

TABLE 2

Formulation and properties of the intermediate polyester polyol

| Adipic acid | Parts by weight | 57.7 |
|---|---|---|
| 1,4-Butanediol | Parts by weight | 31.2 |
| 1,6-Hexanediol | Parts by weight | 10.2 |
| 1,1,1-Trimethylolpropane | Parts by weight | 0.956 |
| OH number | [mg KOH/g] | 60.9 |
| Viscosity (75° C.) | [mPas] | 790 |
| Functionality | | 2.2 |

TABLE 3

Formulation and properties of final polyester polyol product

| | | Example | | |
|---|---|---|---|---|
| | | 5a | 5b | 5c |
| Intermediate | Parts by weight | 90.9 | 83.3 | 76.9 |
| ε-Caprolactone | Parts by weight | 9.1 | 16.7 | 23.1 |
| Weight ratio intermediate Z/ ε-caprolactone | | 9.98:1 | 4.99:1 | 3.33:1 |
| Molar ratio ε-caprolactone/ OH groups of intermediate | | 0.79:1 | 1.59:1 | 2.38:1 |
| Product Properties | | | | |
| OH number | [mg KOH/g] | 54.5 | 49.9 | 45.2 |
| Viscosity (75° C.) | [mPas] | 810 | 830 | 780 |
| Functionality | | 2.2 | 2.2 | 2.2 |
| Free caprolactone | Parts by weight | 0.09 | 0.14 | 0.95 |

The results from Table 3 show that, despite an increase in the molecular weight (which corresponds to a reduction of the OH number), the viscosity of the resultant polyester polyols is less than 1000 Pas (75° C.).

Example 6

Production of a polyurethane with the polyester polyols prepared as described above in Examples 5a, 5b and 5c (which are representative of the invention) as well as from the comparative polyester polyol 1 of Example 1:

Polyester polyols from Example 1 (comparative) and 5b are comparable in terms of their proportion of ε-caprolactone (approx. 16 wt. % in each case). On the other hand, the polyester polyol from Example 5a with approx 9% contains less ε-caprolactone and the polyester polyol from Example 5c with 23% contains more ε-caprolactone than the polyester polyol from comparative Example 1. With regard to the OH number, the polyester polyol from Example 1 (comparative) with a 47.4 mg KOH/g lies between the polyester polyols from Example 5b (49.9 mg KOH/g) and Example 5c (45.2 mg KOH/g). The formulations set forth in Table 4 were prepared such that PU elastomers that are practically identical in terms of their Shore A hardness were obtained in all 4 examples. The Shore A hardness values for each of these 4 examples is within the range of 94 to 95. Thus, in addition to using a different polyester polyol in these examples, it was also necessary to slightly vary the formulation from one example to the next to obtain the same Shore A hardness values.

Example 6 was prepared using the following procedure:

124 parts of the polyester polyol from Example 5a were heated to 130° C. and 27 parts of solid 1,5-naphthalene diisocyanate were added while stirring. After 3 minutes, a vacuum was applied to degas the reaction mixture. The reacting melt heated up to 124° C. after 14 minutes as a result of the NCO—OH reaction. The NCO value of the prepolymer was determined as 4.35 wt. % NCO and the viscosity as 1630 mPas (120° C.). Then, 5.8 parts by weight of 1,4-butanediol were intensively stirred into this prepolymer for 30 seconds in such a way that no air bubbles formed in the mixture. The reacting mixture was poured into molds preheated to 110° C., and was demolded after approx. 15 minutes. The moldings were annealed at 110° C. in a circulating air oven for 24 hours and, after about 1 month's storage at ambient temperature, the mechanical properties were determined.

Examples 7-9 were prepared by essentially the same procedure as set forth above for Example 6, with the different formulations as set forth in Table 4.

TABLE 4

Polyurethane elastomers

| Formulation | | | Example | | | |
|---|---|---|---|---|---|---|
| | | | 6 | 7 | 8 | 9 (comp.) |
| Polyester Polyol from Example 5a | [pts. by wt.] | | 124 | | | |
| Polyester Polyol from Example 5b | [pts. by wt.] | | | 112 | | |
| Polyester Polyol from Example 5c | [pts. by wt.] | | | | 103 | |
| Polyester Polyol from Example 1 (comparative) | [pts. by wt.] | | | | | 120 |
| NDI | [pts. by wt.] | | 27 | 27 | 27 | 27 |
| 1,4-Butanediol | [pts. by wt.] | | 5.8 | 5.8 | 5.8 | 5.8 |
| NCO value, prep., theor. | [wt. % NCO] | | 4.37 | 4.75 | 5.08 | 4.42 |
| NCO value, prep., exp. | [wt. % NCO] | | 4.35 | 4.72 | 4.93 | 4.39 |
| Viscosity, prepolymer | [mPas] at 120° C. | | 1630 | 2030 | 2100 | 2270 |

TABLE 4-continued

Polyurethane elastomers

| Formulation | | | Example 6 | Example 7 | Example 8 | Example 9 (comp.) |
|---|---|---|---|---|---|---|
| Processing: | Polyol temperature | [° C.] | 130 | 130 | 130 | 130 |
| | Crosslinker temperature | [° C.] | 23 | 23 | 23 | 23 |
| | Casting time | [s] | 95 | 65 | 50 | 50 |
| | Mold temperature | [° C.] | 110 | 110 | 110 | 110 |
| | Demolding after | [min] | 15 | 15 | 15 | 15 |
| Mechanical properties: | | | | | | |
| DIN 53505 | Shore A hardness | [Shore A] | 94 | 95 | 94 | 94 |
| DIN 53505 | Shore D hardness | [Shore D] | 36 | 38 | 40 | 37 |
| DIN 53504 | Stress 50% | [MPa] | 7.7 | 8.3 | 8.3 | 7 |
| DIN 53504 | Stress 100% | [MPa] | 9.4 | 10.0 | 10.3 | 8.9 |
| DIN 53504 | Stress 300% | [MPa] | 14 | 15 | 16.1 | 13.9 |
| DIN 53504 | Yield stress | [MPa] | 43.7 | 35.1 | 39.5 | 35.6 |
| DIN 53504 | Elongation at break | [%] | 610 | 530 | 520 | 600 |
| | Graves | [kN/m] | 44 | n.d. | n.d. | 43 |
| | Impact resilience | [%] | 74 | 73 | 71 | 71 |
| DIN 53517 | Compression set 22° C. | [%] | 15.8 | 13.8 | 13.9 | 13.2 |
| DIN 53517 | Compression set 70° C. | [%] | 24.7 | 21.5 | 20.1 | 21.9 |
| DIN 53517 | Compression set 100° C. | [%] | 35.7 | 37.6 | 37.6 | n.d. |

The mechanical properties of the cast elastomers as set forth in Table 4 display hardly any differences. This is true of Examples 6, 7 and 8 which are representative of the invention both among themselves and when compared with the comparative Example 9. More favorable, and in some cases even significantly more favorable, is the processing behavior in the examples according to the invention, particularly with regard to the viscosity of the NCO prepolymers. Here, a clear reduction in prepolymer viscosity is achieved as a function of the variant selected, which simplifies processing.

The examples show that the favorable values found for the viscosity of the polyester polyols according to the invention are also found again in NCO prepolymers produced therefrom and the overall process chain can be designed advantageously.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An isocyanate-terminated prepolymer comprising the reaction product of one or more organic di- or polyisocyanates with one or more polyester polyols having functionalities of from 1.95 to 3.25 and OH numbers of from 90 to 33 mg KOH/g, wherein said polyester polyols comprise the reaction product of:
   1) one or more hydroxyl group-terminated polyester polyols Z having a hydroxyl number of 100 to 40 mg KOH/g and a functionality of 1.95 to 3.25 which are prepared by reacting, at temperatures of from 150 to 250° C. under vacuum:
      a) one or more organic polycarboxylic acids having from 4 to 12 carbon atoms and from 2 to 4 carboxyl groups, derivatives thereof and/or mixtures thereof;
      with
      b) one or more organic polyols having functionalities of from 2 to 4 and number-average molecular weights of from 62 to 400 g/mol,
   with
   2) one or more cyclic ester monomers, in a ratio by weight of polyester polyol Z to cyclic ester monomer of 10:1 to 1:1, at starting temperatures below 220° C.,
   wherein the temperature is less than or equal to 175° C. after no more than 60 minutes, and the OH number of said polyester polyols Z is reduced by at least 5 mg KOH/g and the ratio of moles of the cyclic ester monomer to the hydroxyl groups of the polyester polyol Z ranging from 0.75:1 to 10:1.

2. A process for the production of an isocyanate-terminated prepolymer comprising reacting one or more organic di- or polyisocyanates with one or more polyester polyols having functionalities of from 1.95 to 3.25 and OH numbers of from 90 to 33 mg KOH/g, wherein said polyester polyols comprise the reaction product of:
   1) one or more hydroxyl group-terminated polyester polyols Z having a hydroxyl number of 100 to 40 mg KOH/g and a functionality of 1.95 to 3.25 which are prepared by reacting, at temperatures of from 150 to 250° C. under vacuum:
      a) one or more organic polycarboxylic acids having from 4 to 12 carbon atoms and from 2 to 4 carboxyl groups, derivatives thereof and/or mixtures thereof;
      with
      b) one or more organic polyols having functionalities of from 2 to 4 and number-average molecular weights of from 62 to 400 g/mol,
   with
   2) one or more cyclic ester monomers, in a ratio by weight of polyester polyol Z to cyclic ester monomer of 10:1 to 1:1, at starting temperatures below 220° C.,
   wherein the temperature is less than or equal to 175° C. after no more than 60 minutes, and the OH number of said polyester polyols Z is reduced by at least 5 mg KOH/g and the ratio of moles of the cyclic ester monomer to the hydroxyl groups of the polyester polyol Z ranging from 0.75:1 to 10:1.

3. A process for the production of polyurethanes comprising reacting an isocyanate-terminated prepolymer of claim 1 with one or more compounds selected from the group consisting of chain extenders, crosslinking agents and mixtures thereof.

4. A polyurethane comprising the reaction product of an isocyanate-terminated prepolymer of claim 1 with one or more compounds selected from the group consisting of chain extenders, crosslinking agents and mixtures thereof.

* * * * *